(12) United States Patent
Baker et al.

(10) Patent No.: US 10,971,032 B2
(45) Date of Patent: Apr. 6, 2021

(54) SYSTEMS AND METHODS FOR PROVIDING EXTENSIBLE ELECTRONIC LEARNING SYSTEMS

(76) Inventors: John Allan Baker, Waterloo (CA); Jeremy Jason Auger, Breslau (CA); William Lee, Milton (CA)

(*) Notice: Subject to any disclaimer, the term of this patent is extended or adjusted under 35 U.S.C. 154(b) by 0 days.

(21) Appl. No.: 12/958,263

(22) Filed: Dec. 1, 2010

(65) Prior Publication Data

US 2011/0167026 A1    Jul. 7, 2011

Related U.S. Application Data

(60) Provisional application No. 61/293,072, filed on Jan. 7, 2010.

(51) Int. Cl.
| | |
|---|---|
| *G09B 19/18* | (2006.01) |
| *G09B 19/00* | (2006.01) |
| *G06Q 50/20* | (2012.01) |

(52) U.S. Cl.
CPC ............ *G09B 19/18* (2013.01); *G06Q 50/20* (2013.01); *G06Q 50/205* (2013.01); *G06Q 50/2053* (2013.01); *G06Q 50/2057* (2013.01)

(58) Field of Classification Search
USPC ........................................................ 434/350
See application file for complete search history.

(56) References Cited

U.S. PATENT DOCUMENTS

| | | | | |
|---|---|---|---|---|
| 5,297,249 | A * | 3/1994 | Bernstein et al. | 715/854 |
| 6,587,668 | B1 * | 7/2003 | Miller et al. | 434/350 |
| 8,107,463 | B2 * | 1/2012 | Narayanaswami et al. | 370/352 |
| 8,180,849 | B2 * | 5/2012 | Viegener et al. | 709/217 |
| 8,225,282 | B1 * | 7/2012 | Massoudi et al. | 717/121 |
| 8,239,226 | B2 * | 8/2012 | van Wyk et al. | 705/7.11 |

(Continued)

FOREIGN PATENT DOCUMENTS

WO    WO 2004010297 A1 *   1/2004

*Primary Examiner* — James B Hull
(74) *Attorney, Agent, or Firm* — Bereskin & Parr LLP/S.E.N.C.R.L.,s.r.l.

(57) ABSTRACT

An extensible electronic learning system having at least one learning management system having a learning management processor and a learning management memory operatively coupled thereto, said processor programmed for executing at least one learning management service and providing at least one extensible integration module. Each extensible integration module includes a predefined vendor services interface comprising at least one vendor services definition, and a vendor configuration upload component for receiving vendor configuration settings about at least one vendor. The at least one vendor having a vendor processor and a vendor memory operatively coupled thereto, said vendor processor programmed for executing a least one vendor services, the at least one of said vendor services implementing the at least one of said vendor service definition, and providing at least one vendor integration module, each vendor integration module comprising the predefined vendor services interface and the vendor configuration settings. The vendor configuration settings are received by the extensible integration module such that the learning management system may request the at least one of said vendor services based on the extensible integration module.

17 Claims, 7 Drawing Sheets

(56) References Cited

U.S. PATENT DOCUMENTS

| | | | |
|---|---|---|---|
| 8,291,490 B1* | 10/2012 | Ahmed et al. | 726/17 |
| 2005/0019740 A1* | 1/2005 | Cunningham et al. | 434/350 |
| 2006/0286536 A1* | 12/2006 | Mohler et al. | 434/350 |
| 2007/0208777 A1* | 9/2007 | Van Wyk et al. | 707/104.1 |
| 2007/0224585 A1* | 9/2007 | Gerteis et al. | 434/350 |
| 2007/0233782 A1* | 10/2007 | Tali | 709/203 |
| 2007/0266035 A1* | 11/2007 | Hays et al. | 707/10 |
| 2008/0131861 A1* | 6/2008 | Redd et al. | 434/362 |
| 2008/0213741 A1* | 9/2008 | Redd et al. | 434/365 |
| 2008/0254434 A1* | 10/2008 | Calvert | 434/350 |
| 2009/0182716 A1* | 7/2009 | Everhart | G06Q 10/10 |
| 2009/0197234 A1* | 8/2009 | Creamer et al. | 434/350 |
| 2009/0291426 A1* | 11/2009 | Polivka | 434/350 |
| 2009/0328181 A1* | 12/2009 | Ye et al. | 726/9 |
| 2010/0120008 A1* | 5/2010 | McDonagh et al. | 434/323 |
| 2010/0235395 A1* | 9/2010 | Cepuran et al. | 707/783 |
| 2010/0255454 A1* | 10/2010 | Zhou et al. | 434/350 |
| 2010/0333082 A1* | 12/2010 | Keys et al. | 717/173 |
| 2011/0020781 A1* | 1/2011 | Yang | 434/350 |
| 2011/0039244 A1* | 2/2011 | Packard et al. | 434/350 |
| 2011/0055100 A1* | 3/2011 | Perreault et al. | 705/327 |
| 2011/0151425 A1* | 6/2011 | Smith et al. | 434/350 |
| 2011/0151426 A1* | 6/2011 | Oberg | 434/350 |
| 2012/0052475 A1* | 3/2012 | Carman | 434/350 |
| 2012/0079380 A1* | 3/2012 | Tsai et al. | 715/716 |
| 2012/0225415 A1* | 9/2012 | Vento et al. | 434/350 |
| 2012/0288842 A1* | 11/2012 | Cairns | 434/350 |
| 2012/0301861 A1* | 11/2012 | McBride et al. | 434/350 |
| 2012/0301862 A1* | 11/2012 | Spector | 434/350 |
| 2012/0315616 A1* | 12/2012 | Fourman | 434/350 |

* cited by examiner

SYSTEMS AND METHODS FOR PROVIDING EXTENSIBLE ELECTRONIC LEARNING SYSTEMS

RELATED APPLICATIONS

This application claims the benefit of U.S. Provisional Application No. 61/293,072 filed Jan. 7, 2010 and entitled SYSTEMS AND METHODS FOR PROVIDING EXTENSIBLE ELECTRONIC LEARNING SYSTEMS, the entire contents of which are hereby incorporated by reference herein for all purposes.

FIELD

The embodiments described herein relate to electronic learning, and more particularly to systems and methods for integrating components of electronic learning systems.

INTRODUCTION

Electronic learning (also called e-Learning or eLearning) generally refers to education or learning where users engage in education related activities using computers and other computer devices. For example, users may enroll or participate in a course or program of study offered by an educational institution or other organizations (e.g. a college, university, grade school, a business or a governmental organization) through a web interface that is accessible over the Internet. Similarly, users may receive assignments electronically, participate in group work and projects by collaborating online, and be graded based on assignments and examinations that are submitted using an electronic dropbox.

An electronic learning system may be used to facilitate electronic learning. The electronic learning system contains a plurality of software and hardware components necessary to implement various features of electronic learning. For example, such features may include: use of electronic learning materials (e.g. handouts, textbooks, etc.), web-casting of live or recorded lectures, interaction through virtual chatrooms or discussion boards, and performing web-based presentations. The users may access such features through a centralized electronic learning environment.

Software components of an electronic learning system may be provided by various vendors, and the software provided by various vendors may not be inherently compatible with each other. Additional effort may be required to integrate various software components in a learning system either by modifying one or both of the incompatible components, or developing a new component or a system that can facilitate integration between the two incompatible components.

Each software component of the electronic learning system may also be developed independently without contemplating the features that are being developed in other software components. This may result in these features not being effectively utilized by software components that were developed before or in parallel with the development of the software components implementing these features.

New software components may also become available after an existing software component has been deployed. In such cases, additional effort may be required to integrate these new software components in the electronic learning system, and even if the new software components are integrated, certain features of the new software may not be utilized effectively as these features were not contemplated when the existing software component was developed.

Accordingly, there is a need for improved electronic learning systems and methods that address at least some of these concerns.

SUMMARY

According to one embodiment, there is provided an extensible electronic learning system comprising at least one learning management system having a learning management processor and a learning management memory operatively coupled thereto, said processor programmed for executing at least one learning management service and providing at least one extensible integration module.

Each extensible integration module comprises a predefined vendor services interface comprising at least one vendor services definition, and a vendor configuration upload component for receiving vendor configuration settings about at least one vendor. The at least one vendor having a vendor processor and a vendor memory operatively coupled thereto, said vendor processor programmed for executing a least one vendor service, the at least one of said vendor services implementing the at least one of said vendor service definition, and providing at least one vendor integration module, each vendor integration module comprising the predefined vendor services interface and the vendor configuration settings.

The vendor configuration settings are received by the extensible integration module such that the learning management system may request the at least one of said vendor services based on the extensible integration module.

In some embodiments, the extensible integration module may further comprise a predefined learning management services interface having at least one learning management services definition.

In some embodiments, the learning management services implements at least one of the said learning management services definitions.

In some embodiments, the vendor integration module further comprises the at least one predefined learning management service interface.

In some embodiments, the learning management processor is further programmed for actively requesting the at least one of said vendor services based on the extensible integration module.

In some embodiments, the vendor processor is further programmed to actively request the at least one of said learning management services based on the vendor integration module.

In some embodiments, at least one of said learning management services is deeply integrated with at least one of said vendor services based on the at least one vendor services definition.

In some embodiments, the at least one deeply integrated learning management service may request the at least one deeply integrated vendor service natively.

In some embodiments, the at least one of said vendor services is deeply integrated with at least one of said learning management services based on the at least one learning management services definition.

In some embodiments, the at least one deeply integrated vendor service may request the at least one deeply integrated learning management services natively.

In some embodiments, the learning management processor is further programmed for not requesting vendor services from the at least one vendor if the vendor configuration settings for the at least one vendor are not received in the vendor configuration upload component.

In some embodiments, the at least one vendor configuration settings comprises vendor information for requesting services from the vendor associated with the vendor configuration settings.

In some embodiments, the vendor configuration settings comprise at least one of vendor location information, communication security information, and authentication information.

In some embodiments, the at least one vendor comprises a plurality of vendors.

In some embodiments, software for programming the learning management processor is developed in view of the predefined vendor services interface.

In some embodiments, software for programming the vendor processor is developed in view of the predefined learning management services interface.

In some embodiments, software to program the processor in the learning management and the processor in the vendor are developed independently in view of at least one of the predefined vendor services interface and the predefined learning management services interface.

According to yet another embodiment, there is provided a computer implemented extensible electronic learning method using a processor and a memory operatively coupled thereto comprising the steps of executing at least one learning management service, and providing at least one extensible integration module comprising a predefined vendor services interface having at least one vendor services definition, and a vendor configuration upload component for receiving vendor configuration settings about at least one vendor.

In some embodiments, the method further comprises receiving the vendor configuration settings for requesting the at least one vendor service based on the extensible integration module.

According to yet another embodiment, there is provided computer implemented extensible electronic learning method using a processor and a memory operatively coupled thereto comprising the steps of executing at least one vendor service, and providing at least one vendor integration module comprising a predefined learning management services interface having at least one learning management services definition and vendor configuration settings.

In some embodiments, the method comprises the step of uploading the vendor configuration settings to a vendor configuration upload component on a learning management system for requesting the at least one learning management service based on the vendor integration module.

According to yet another embodiment, there is provided a tangible computer readable medium including computer executable instructions which, when executed on a computing device, cause the computing device to execute at least one learning management service, and provide at least one extensible integration module comprising a predefined vendor services interface having at least one vendor services definition, and a vendor configuration upload component for receiving vendor configuration settings about at least one vendor.

In some embodiments, the instructions further cause the computing device to receive the vendor configuration settings for requesting the at least one vendor service based on the extensible integration module.

In some embodiments, the computer readable medium is non-transitory.

According to yet another embodiment, there is provided a tangible computer readable medium including computer executable instructions which, when executed on a computing device, cause the computing device to execute at least one vendor service and provide at least one vendor integration module comprising a predefined learning management services interface having at least one learning management services definition and vendor configuration settings.

In some embodiments, the instructions further cause the computing device to upload the vendor configuration settings to a vendor configuration upload component on a learning management system for requesting the at least one learning management service based on the vendor integration module.

In some embodiments, the computer readable medium is non-transitory.

DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Figure 1:
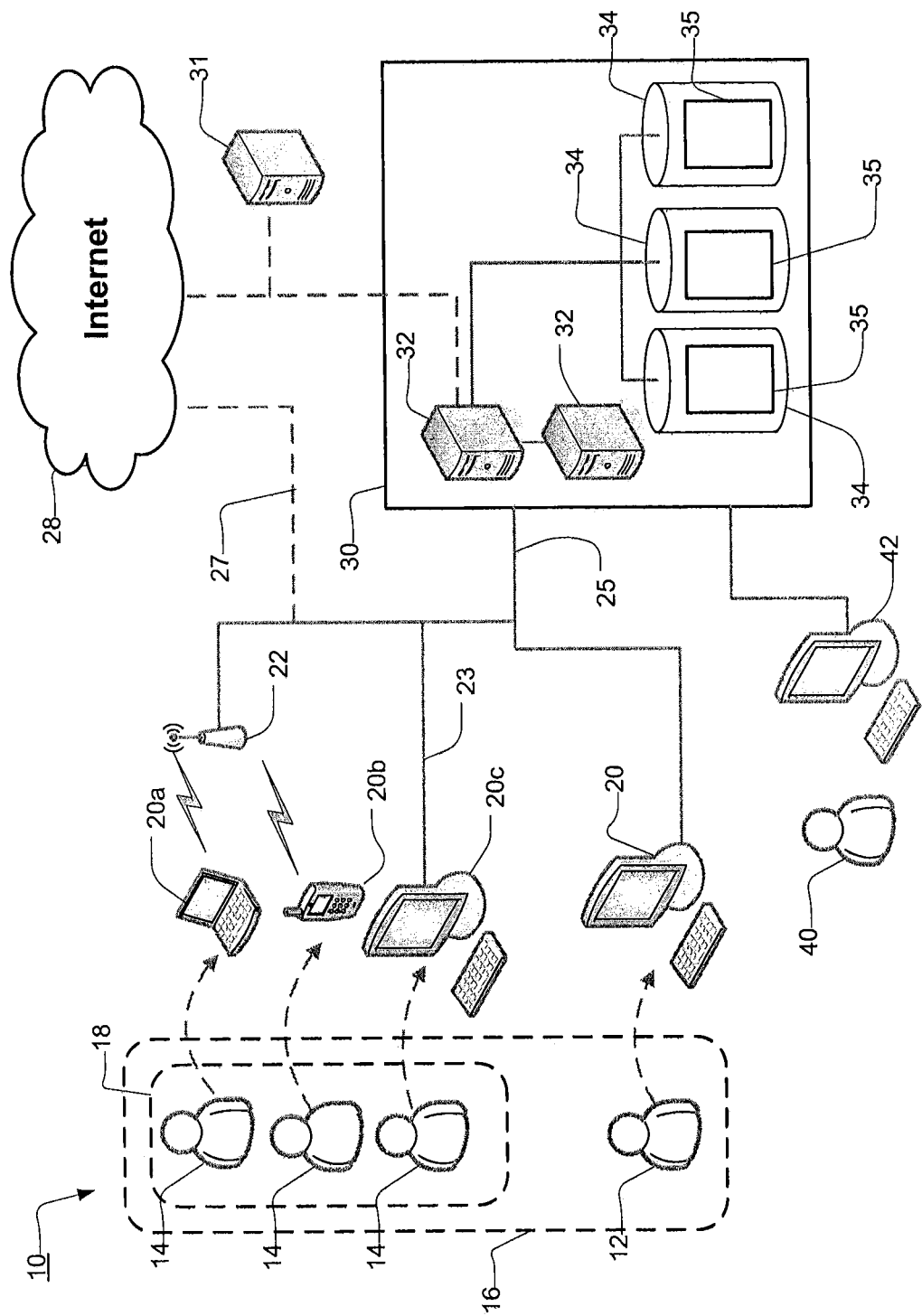
FIG. 1 is an electronic learning system according to one embodiment.

Turning now to FIG. 1, illustrated therein is a system 10 for providing guided instructional design according to one embodiment.

Using the system 10, one or more users 12, 14 may communicate with an educational service provider 30 to participate in, create, and consume electronic learning services. The users 12, 14 may be individuals or user accounts associated with the users.

In some cases, the educational service provider 30 may be part of or associated with a traditional "bricks and mortar" educational institution (e.g. a grade school, university or college), another entity that provides educational services (e.g. a company that specializes in offering training courses, or an organization that has a training department), or may be an independent service provider (e.g. for individual electronic learning).

In some embodiments, an educational group can be defined that includes one or more of the users 12, 14. For example, as shown in FIG. 1, the users 12, 14 may be grouped together in an educational group 16 that represents a particular course (e.g. History 101, French 254). The users 12, 14 may consume learning services. The users 12, 14 may not necessarily consume like learning services. For example, the user 12 may consume learning services provided to instructors of a course, while users 14 may consume learning services provided to learners in a course.

In some examples, the users 12, 14 may be associated with more than one educational group (e.g. the user 12 may have lecturing responsibilities in two or more courses, and also participate in more than one course as a learner).

In some cases, educational sub-groups may also be formed. For example, two of the users 14 are shown as part of educational sub-group 18, which may be formed in relation to a particular project or assignment (e.g. sub-group 18 may be a lab group or study group). In some embodiments, due to the nature of the electronic learning, the users 14 in a particular sub-group 18 need not physically meet, but may collaborate together using learning services provided by the educational service provider 30.

In some embodiments, other groups 16 and sub-groups 18 could include users 14 that share common interests (e.g. interests in a particular sport), that participate in common activities (e.g. users that are members of a choir or a club), and/or have similar attributes (e.g. users that are male, users under twenty-one years of age, etc.).

The communication between the users 12, 14 and the educational service provider 30 can occur either directly or indirectly using any suitable computing device. For example, the user 12 may use a computing device 20 such as a desktop computer that has at least one input device (e.g. a keyboard and a mouse) and at least one output device (e.g. a display screen and speakers). The computing device 20 can generally be any other suitable device for facilitating communication between the users 12, 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, or a terminal 20c over a wired connection 23.

The computing devices 20 may be connected to the service provider 30 via any suitable communications channel 27. For example, the computing devices 20 may be communicate to the educational service provider 30 over a local area network (LAN) or intranet, or using an external network (e.g. by using a browser on the computing device 20 to browse to one or more web pages presented over the Internet 28).

In some examples, one or more of the users 12, 14 may be required to authenticate their identities in order to communicate with the educational service provider 30. For example, the users 12, 14 may be required to input a login name and/or a password to gain access to the services provided by the educational service provider 30.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system.

The educational service provider 30 generally includes a number of functional components for facilitating the provision of electronic learning services. For example, the educational service provider 30 generally includes one or more processing devices 32 (e.g. servers), each having one or more processors. The processing devices 32 are configured to send information (e.g. web page content) to be displayed on one or more computing devices 20 in association with the electronic learning system 10. In some embodiments, the processing device 32 may be a computing device 20 (e.g. a laptop or personal computer).

The educational service provider 30 also generally includes one or more data storage devices 34 that are in communication with the processing devices 32 (e.g. servers), and could include a relational database, file system, or any other suitable data storage device. The data storage devices 34 are configured to host data 35 such as course content and enrollment information.

The data storage devices 34 may also store authorization criteria that define what actions may be taken by the users 12, 14. The authorization criteria may also include at least one security profile associated with at least one role. For example, one role could be defined for users who are primarily responsible for teaching or assessing work product from other users. Users with such a role may have a security profile that allows them to post assignments to the electronic portfolios associated with users that are enrolled in a particular course. Learning services may provide for the authenticating process to authenticate users 12, 14.

In some embodiments, some of the authorization criteria may be defined by specific users 40 who may or may not be part of the educational community 16. For example, users 40 may be permitted to define global configuration profiles for the system 10, define roles within the system 10, set security profiles associated with the roles, and assign the roles to particular users 12, 14 in the system 10. The assigned role may be related to the users' participation related to certain activity. For example, a user may be assigned a "learner" role in some courses, and assigned an "instructor" role in some other courses. Authorization of a user's action in an activity may be based on the user's role related to the activity. The authorization granted by the roles may be predefined. In some cases, the users 40 may use another computing device 42 (e.g. a desktop computer) to accomplish these tasks. Users 40 may use learning services to define the authorization criteria.

The data storage devices 34 may also be configured to store other information, such as personal information about the users 12, 14 of the system 10, information about which courses the users 12, 14 are enrolled in, roles to which the users 12, 14 are assigned in various contexts, particular interests of the users 12, 14 and so on.

The processing devices 32 and data storage devices 34 may also be configured to provide other electronic learning capabilities (e.g. allowing users to enroll in courses), and/or may be in communication with one or more other service providers that provide such other electronic learning capabilities.

In some embodiments, the system 10 may also have one or more backup servers 31 that may duplicate some or all of the data 35 stored on the data storage devices 34. The backup servers 31 may be desirable to prevent data loss in the event of an accident such as a fire, flooding, hardware failure, or theft.

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

Figure 2:
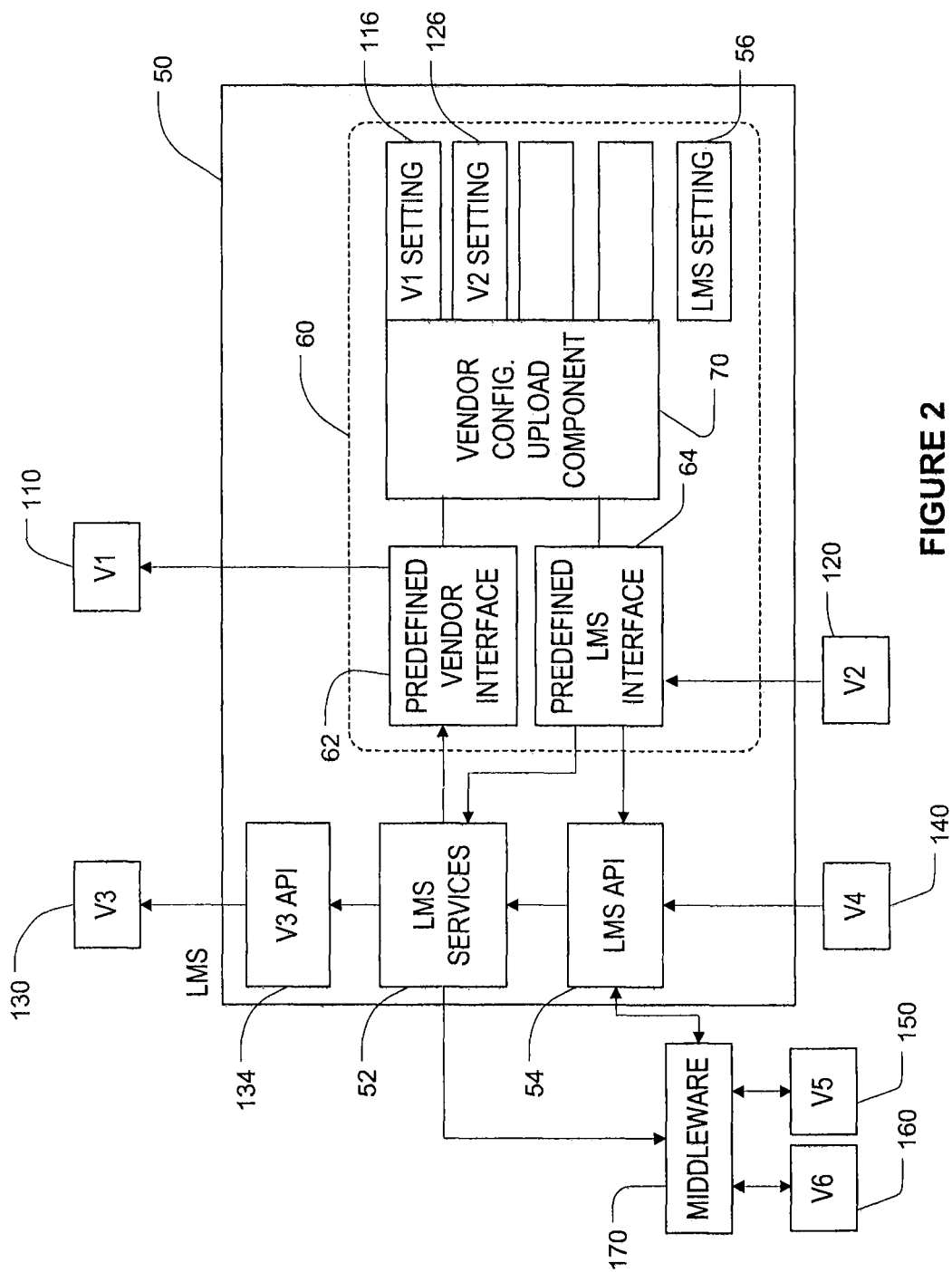
FIG. 2 is a schematic representation of a learning management system according to one embodiment.

Referring to FIG. 2, provided therein is a learning management system 50 according to one embodiment. The learning management system 50 may include a learning management processor (not shown) and a learning management memory (not shown) coupled to the learning management processor. The learning management processor is programmed to perform at least one learning management service. The learning management processor may be the processing device 32 (server). The learning management processor may be one or more of the computing devices 20, 20a, 20b, 20c and 42. The learning management memory may be memory resident on the processing device 32 and/or one or more of the computing devices 20, 20a, 20b, 20c and 42. The first learning management memory may also be one or more of the data storage devices 35.

The learning management processor in the learning management system 50 is programmed for providing a learning management services module 52 for performing learning management services. The learning management services may be at least a part of one or more electronic learning services provided by the system 10.

The electronic learning services may implement at least some of the functionalities and tools provided by the system 10. For example, the electronic learning services may include electronic live and/or prerecorded lecture webcasts, online presentations, electronic publications, generation of course content, authorization and security services, facilitated group discussions, grade book functions, quizzing, testing and other assessment tools, electronic chat rooms, course management software, online course syllabi, user profiles including learner profiles, instructor profiles, and administrator profiles, and social networking amongst learners and between learners and instructors and/or other roles.

The learning management services performed by the learning management system 50 may be for providing a learning environment comprising a web-based suite of teaching and learning tools for course development, delivery, and management. They may also be for providing a platform for collecting, organizing, reflecting, and presenting learning artifacts such as assignments, group projects and learner portfolios. They may also be for providing competency tracking and reporting tools. They may also be for data and knowledge mining and analysis. They may also be for providing modules for storing, tagging, searching and reusing of learning content across multiple programs, courses and sections. They may also be for providing synchronous chat, whiteboard, and presentation modules for facilitating real-time collaboration.

The learning management services may also be setting data or getting data from the learning management memory or other data storage devices such as data storage device 34 that it may have access to.

Each learning management service performed by the learning management services module 52 may be active, passive or a combination of being active and passive.

If the service is an active learning management service, then it will request one or more other services. The one or more other services may be requested from vendor systems external to the learning management system 50, such as first vendor "V1" 110, a third vendor "V3" 130, and a fifth vendor "V5. The services may also be requested internally within the learning management system 50 (not shown).

If a service performed by the learning services module 52 is passive, then it will provide the service upon request by one or more other services. The request may be received from one or more vendor systems external to the learning management system 50, such as the first vendor vendor "V1" 110, the fourth vendor "V4" 140 and the fifth vendor "V5" 150. The service request may also be received internally within the learning management system 50 (not shown).

A service performed by the learning services module may be neither active nor passive. For example, a service could be self-initiated, without being initiated by any incoming service requests, and may not include any outgoing service requests.

A service performed by the learning management services module may be both active and passive. For example, a service initiated by a request from another service, may request yet other services.

By way of an example, an active and passive service performed by the learning services module 52 may be a chat room service for providing an electronic chat room for a tutorial.

The learning management system 50 may provide a course management service for managing online contents of a course. The course management service may include a web page link to request a chat room. If one or more of the users 12, 14 request a chat room, that service may request another service (the chat room service) to provide the chat room.

The chat room service may prompt and receive chat room parameters from the initiating users 12, 14. The chat room parameters may include the number of participants, identity of the moderator, and aliases for participants for that chat room. Upon receipt of the chat room parameters, the chat room service will request another service to authenticate and display the chat room on participant users' computing devices 20.

The service to authenticate and display the chat room may be requested from vendors providing the service of displaying chat rooms resident on each computing device 20. A different vendor may perform this service on a different computing device. For example, the service to display a chat room may be performed using Flash® by Adobe® Systems on the computing device 20a, and performed using a text-based html site on the computing device 20b. In the foregoing example, the chat room service is both active and passive in that it receives service request from one service (from the service that provides learning management web link) and requests a service from another (vendors to display the chat room).

As shown in FIG. 2, the learning management services module 52 includes a combination of both active and passive services as it sends services requests to vendors, and receives services requests from vendors. Generally, sending a service request to a vendor will require the service request to be in a format compatible with the recipient vendor.

The learning management system 50 may include learning management services application programming interface (API) 54 for requesting learning management services. The learning management services API 54 may generally contain information about the services provided by the learning management services module 52, and acceptable formats to request those services in a compatible form. The acceptable formats may include parameters expected and syntax of the service requests.

Systems who are aware of the learning management services API 54 may request services from the learning management services module 52. As shown, Vendor "V4" as indicated by 140, and middleware 170 send service request using the learning management API module 54. Similarly, the learning management system 50 is aware of a third vendor "V3" API 134 for requesting services from the third vendor V3 and sends services requests to vendor V3 using the vendor V3 API.

However, the learning management system 50 is generally not aware of APIs for vendors V1, V5 and V6. Conversely, the vendors V2, V5, and V6 are also unaware of the learning management services API 54. This restricts the ability of the learning management system 50 and the vendors V1, V2, V5, and V6 to request services from each other directly.

To facilitate communication with vendors V1 and V2, the learning management system 50 includes an extensible integration module 60.

The extensible integration module 60 includes a predefined vendor services interface 62, a predefined learning management services interface 64, and a vendor configuration upload component 70. In the embodiment as shown, the extensible integration module 60 further includes learning management system configuration settings 56 and vendor configuration settings about vendors V1 and V2 as indicated by 116, and 126 respectively.

The predefined vendor services interface 62 includes vendor services definitions about vendor services that one or more vendors are expected to provide. The vendor services definitions may also include parameters required for those services. These definitions may be implemented by one or more vendor systems.

Exemplary vendor services definitions may be for provision of an electronic chat room. The definitions may include base-level services expectations that any vendor providing electronic chat room services implementing the definitions should meet. The definitions may include services for creation of a new permanent chat room with parameters for the max number of participants, participant email addresses, option to send out invites, room title, and specific room capabilities (for e.g., availability of private chat between the members), ability to change aliases, etc. The definitions may also include services for deletion of rooms, updating room configurations, etc.

The vendor services definitions allow the learning management system 50 to be developed in view of the definitions. This may permit learning management system 50 to natively request vendor services, that is the learning management system 50 can request vendor services from vendor systems in a format compatible to the vendor without a need for conversion tool and/or integration of the vendor's API. This may be of particular advantage if there are the learning management system 50 is desirous of requesting services from multiple vendors with multiple vendor APIs.

The vendor services definitions also permit deep integration between the learning management system 50 and the vendors in that the learning management system 50 may be designed in view of the services that are expected to be provided by the vendors. Deep integration allows the learning management system 50 to leverage the expected vendor services such that duplication of services may be reduced. Deep integration also permits more effective use of vendor services as the services provided by the learning management system 50 may be designed specifically to maximize the utilization of the features provided by the vendor services. For example, in designing the learning management system 50, the expected vendor services may be included in workflows, quick-link functionality, scheduled events/tasks, embedded in content, etc. These vendor services may be set to be latent until further information regarding availability to these vendor services is received at the vendor configuration upload component 70.

The vendor services definitions may also reduce scheduling constraints in the development of the learning management system and the vendor systems. That is, each of the systems may be developed independently and yet remain deeply integrated.

The predefined learning management services interface 64 includes learning management services definitions about learning management services that at least one learning management system 50 is expected to provide. The learning management services definitions may also include parameters required for those services. The learning management services 52 module may implement one or more of these definitions. Exemplary learning management definitions may include functions that permit access to data such as retrieving and setting grade information, student biographical information, etc.

The learning management services definitions allow the vendor systems to be developed in view of the definitions. This may permit vendors to natively request learning management services without requiring any external conversion tool and/or integration of the learning management system's API 54.

The learning management services definitions also permits deep integration between the vendors to the learning management system 50 in that the vendors may be designed in view of the services that are expected to be provided by the learning management system 50. Deep integration allows the vendors to leverage the learning management system services such that duplication of services may be reduced. Deep integration also permits more effective use of learning management system services as the services provided by the vendor may be designed specifically to maximize utilization of the features provided by the learning management system.

The learning management services definitions may also reduce scheduling constraints in the development of the learning management system and the vendor systems. That is, each of the systems may be developed independently and yet remain deeply integrated.

The vendor configuration upload component 70 receives vendor configuration settings at the learning management system 50. Vendor configuration settings may contain Information that may be used to communicate with respective vendors. Each vendor configuration setting may contain information such as the location of the vendor (e.g. URI/URL), secret keys, passwords, performance settings, display options, encryption settings, etc. As shown, the configuration settings for the vendors V1 and V2 are indicated by 116, and 126 respectively. The configuration settings for the learning management system indicated by 56 may be transmitted to one or more vendor systems for similar purposes.

The vendor configuration settings may be received from any individual or system with appropriate access. For example, vendor configuration settings may be received from any of the users, educational institution, the learning management system and/or vendor systems.

Receiving of vendor configuration settings may also indicate to the learning management system 50 of the availability for request of one or more expected service implementing the vendor services definitions. It may also indicate that one or more vendors are now available to provide vendor services upon request. Upon receipt of the vendor configuration from a particular vendor, the learning management system may start making vendor services requests from that vendor.

The learning management system 50 may communicate with vendors V1 and V2 using the extensible integration module 60. As shown, the learning management system 50 receives service requests from the vendor V2 according to the predefined learning management services interface 64, and sends services requests to the vendor V1 according to the predefined vendor interface 62.

Figure 3:
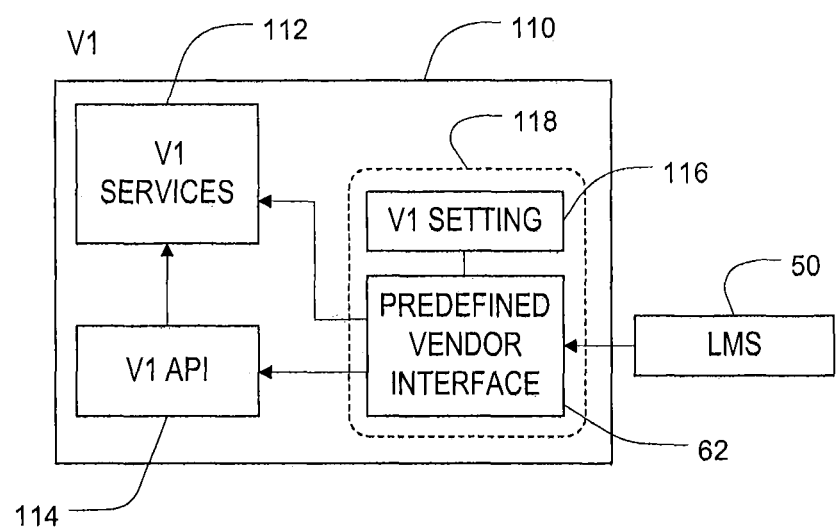
FIG. 3 is a schematic representation of a first vendor system V1 shown in FIG. 2.

Referring to FIG. 3, provided therein is the first vendor V1 as indicated by 110. The first vendor V1 may include a first vendor processor (not shown) and a first vendor memory (not shown) coupled to the first processor. The first vendor processor may be programmed to perform at least one vendor service. The at least one vendor service may implement at least one of the vendor services definitions. The first vendor processor may be the processing device 32. Alternatively, the first vendor processor also may be one or more of the computing devices 20, 20a, 20b, 20c and 42. The first vendor memory may also be a memory resident on the processing device 32 and/or one or more of the computing devices 20, 20a, 20b, 20c and 42. The first memory may also be one or more of the data storage devices 35.

The first vendor processor in the first vendor V1 may be programmed to provide a first vendor V1 services module 112, a first vendor V1 API 114 and the vendor integration module 118.

The first vendor V1 services module 112 may perform vendor services. The vendor services may implement at least a part of one or more electronic learning services that provides at least some of the functionalities and tools provided by the system 10 as described herein above.

In the embodiment as shown, all of the services provided by the first vendor V1 services module 112 are passive. This is only for illustrative purposes as services performed by a vendor will typically be both active and passive.

The first vendor V1 has a first vendor V1 API 114 for requesting services from the V1 services module 112. However, the learning management system may be unaware of the first vendor V1 API 114 and may not request services using that API. This may arise in exemplary situations where the V1 API 114 is developed after, or concurrently with the learning management system 50.

The first vendor V1 has the vendor integration module 118. The vendor integration module 118 is similar to the extensible module 60 of the learning management system 50, and like elements are indicated by like numbers. As shown, the vendor integration module 118 includes the first vendor V1 configurations settings 118 and the predefined vendor services interface 62. The vendor V1 configuration settings are uploaded to the learning management system 50. The first vendor V1 may receive service requests from the learning management system 50 in accordance with the predefined vendor services interface 62 as indicated.

The first vendor V1 services module 112 may either implement the predefined vendor services interface 62 directly, through use of the first vendor V1 API 114 or another conversion module (not shown). In the embodiment as shown, the predefined vendor services interface 62 is implemented through a combination of the first vendor V1 API 114 and the first vendor V1 services module directly. In other embodiments (not shown), an additional module interfacing between first vendor V1 API and predefined vendor services interface may be implemented. The additional module may be used for example in situations wherein the API is developed prior to the predefined vendor services interface.

Figure 4:
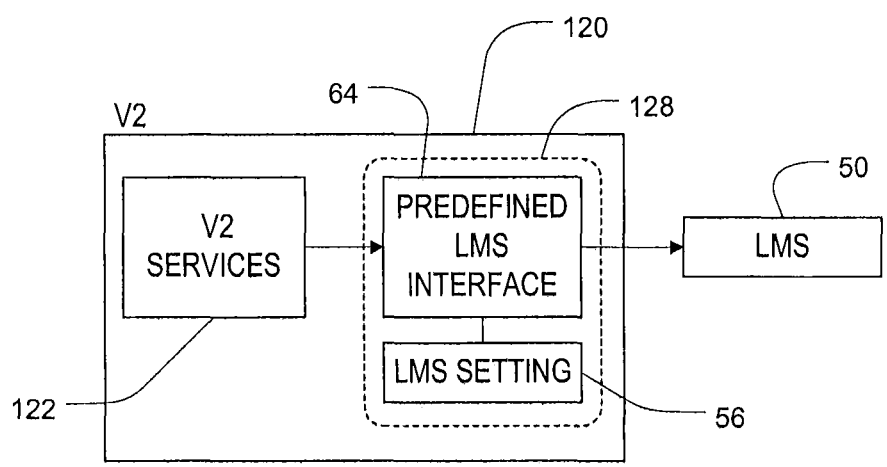
FIG. 4 is a schematic representation of a second vendor system V2 shown in FIG. 2.

Referring to FIG. 4, provided therein is the second vendor V2 as indicated by 120. The second vendor V2 may include a second vendor processor (not shown) and a second vendor memory (not shown) coupled to the second processor.

The second vendor processor may be programmed to perform at least one vendor service. The at least one vendor service may implement at least one of the vendor services definitions. The second vendor processor may be the processing device 32 (server). The second vendor processor also may be one or more of the computing devices 20, 20a, 20b, 20c and 42. The second vendor memory may be a memory resident on the processing device 32 and/or one or more of the computing devices 20, 20a, 20b, 20c and 42. The second memory may also be one or more of the data storage devices 35.

The second vendor processor in the second vendor V2 may be programmed to provide a second vendor services module 122 and the vendor integration module 128.

The V2 services module 122 may perform vendor services. The vendor services may implement at least a part of one or more electronic learning services that provides at least some of the functionalities and tools provided by the system 10 as described herein above.

In the embodiment as shown, all of the services provided by the second vendor V2 services module 122 are active. This is only for illustrative purposes as services performed by a vendor will typically be both active and passive.

The second vendor V2 may request services from the learning management system 50. However the second vendor V2 may be unaware of the learning management services API 54 and may not request services using that API. This may arise in exemplary situations where the second vendor V2 is developed before, or concurrently with the learning management system 50.

The second vendor V2 also has the vendor integration module 128. The vendor integration module 128 is similar to the extensible module 60 of the learning management system 50, and like elements are indicated by like numbers. The vendor integration module 128 includes the second vendor V2 configurations settings 128 and the predefined learning management services interface 64. The second vendor V2 configuration settings are uploaded to the learning management system 50. The second vendor V2 may be developed in view of the predefined learning management services interface 64 such that the second vendor may natively request the learning management services through the vendor integration module.

The second vendor V2 may request learning management services from the learning management system 50 in accordance with the predefined learning management service interface 64 as indicated.

Figure 5:
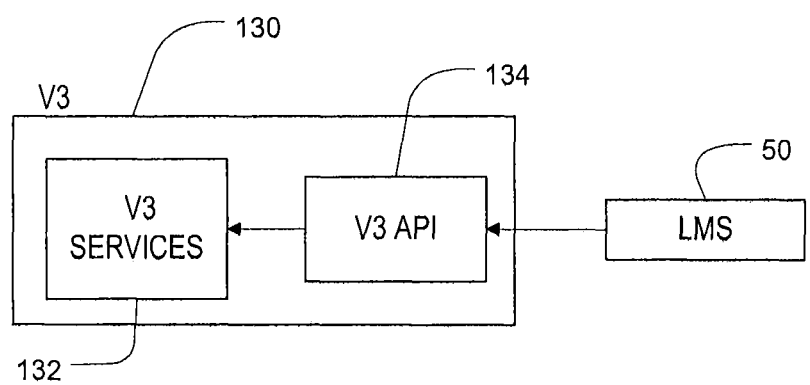
FIG. 5 is a schematic representation of a third vendor system V3 shown in FIG. 2.

Referring to FIG. 5, provided therein is the third vendor V3 as indicated by 130. The third vendor V3 may include a third vendor processor (not shown) and a third vendor memory (not shown) coupled to the third processor. The third vendor processor may be programmed to perform at least one vendor service. The third vendor processor may be the processing device 32 (server). The third vendor processor also may be one or more of the computing devices 20, 20a, 20b, 20c and 42. The third vendor memory may be a memory resident on the processing device 32 and/or one or more of the computing devices 20, 20a, 20b, 20c and 42. The third memory may also be one or more of the data storage devices 35.

The third vendor processor in the third vendor V3 may be programmed to provide a third vendor services module 132 and the third vendor API 134.

The V3 services module 132 may perform vendor services. The vendor services may implement at least a part of one or more electronic learning services that provides at least some of the functionalities and tools provided by the system 10 as described herein above.

In the embodiment as shown, all of the services provided by the V3 services module 132 are passive. This is only for illustrative purposes as services performed by a vendor will typically be both active and passive.

The third vendor V3 may receive request services from the learning management system 50. Since the learning management system 50 is aware of the third vendor API 134, the learning management system 30 may request third vendor V3 services according to that API. This may arise in exemplary situations where the learning management system 50 is developed after the third vendor V3 and has integrated third vendor V3 API 134, or has integrated the third vendor API 134 after development.

Figure 6:
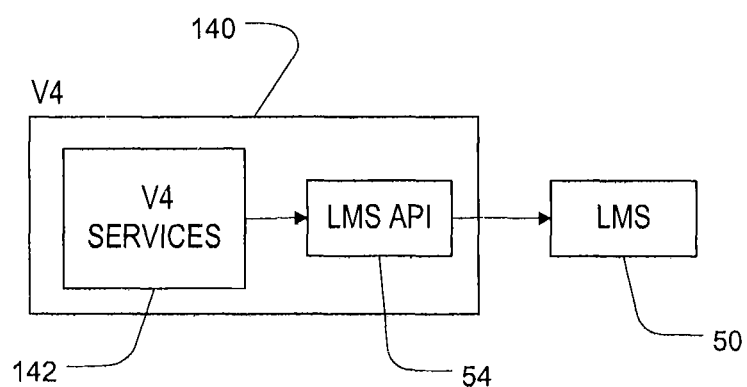
FIG. 6 is a schematic representation of a fourth vendor system V4 shown in FIG. 2.
Figure 7:
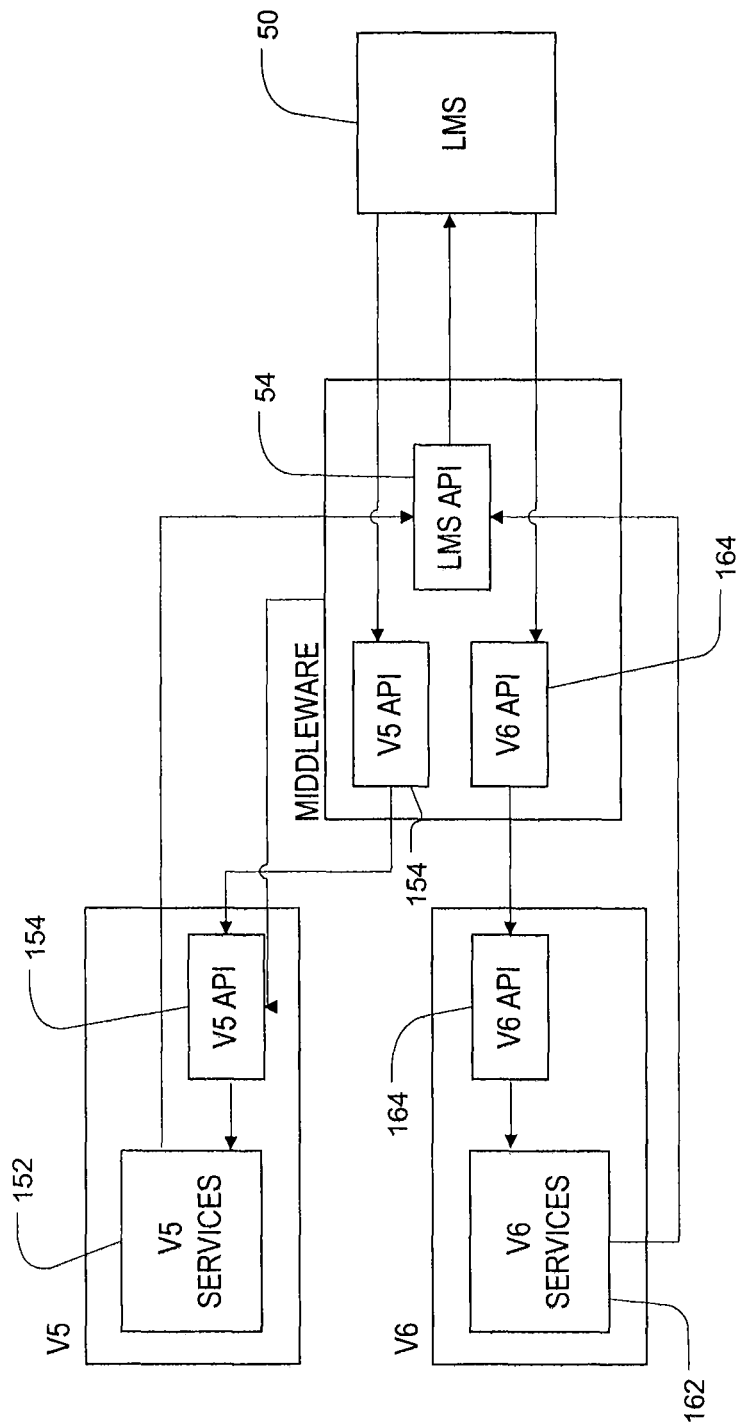
FIG. 7 is a schematic representation of a fifth vendor systems V5, V6 and middleware system shown in FIG. 2.

Referring to FIG. 6, provided therein is the fourth vendor V4 as indicated by 140. The fourth vendor V4 may include a fourth vendor processor (not shown) and a fourth vendor memory (not shown) coupled to the fourth processor. The fourth vendor processor may be programmed to perform at least one vendor service. The fourth vendor processor may be the processing device 32 (server). The fourth vendor processor also may be one or more of the computing devices 20, 20a, 20b, 20c and 42. The fourth vendor memory may be a memory resident on the processing device 32 and/or one or more of the computing devices 20, 20a, 20b, 20c and 42. The fourth memory may also be one or more of the data storage devices 35.

The fourth vendor processor in the fourth vendor V4 may be programmed to provide a fourth vendor services module 142 and request for learning management, services using the learning management services API 54.

The V4 services module 142 may perform vendor services. The vendor services may implement at least a part of one or more electronic learning services that provides at least some of the functionalities and tools provided by the system 10 as described herein above.

In the embodiment as shown, all of the services provided by the V4 services module 142 are active. This is only for illustrative purposes as services performed by a vendor will typically be both active and passive.

The fourth vendor V4 may request services from the learning management system 50. Since the fourth vendor V4 is aware of the learning management system API 54, the fourth vendor may request learning management services according to that API. This may arise in exemplary situations where the fourth vendor V4 is developed before the learning management system 50 and has integrated the learning management API 54, or has integrated the learning management API 54 after development.

Referring to FIG. 6, provided therein is the fifth vendor V5, a sixth vendor V6, and a middleware system indicated by 150, 160 and 170 respectively. Each of the vendors V5, V6 may include a fifth/sixth vendor processor (not shown) and a fifth/sixth vendor memory (not shown) coupled to the fifth/sixth processor respectively. The fifth/sixth vendor processor may be programmed to perform at least one vendor service. The fifth/sixth vendor processor may be the processing device 32 (server). The fifth/sixth vendor processor also may be one or more of the computing devices 20, 20a, 20b, 20c and 42. The fifth/sixth vendor memory may be a memory resident on the processing device 32 and/or one or more of the computing devices 20, 20a, 20b, 20c and 42. The fifth/sixth memory may also be one or more of the data storage devices 35.

The middle system may include a middle ware processor (not shown) and middle ware memory (not shown) coupled to the middleware processor. The middleware processor may be the processing device 32 (server). The middleware processor also may be one or more of the computing devices 20, 20a, 20b, 20c and 42. The middleware memory may be a memory resident on the processing device 32 and/or one or more of the computing devices 20, 20a, 20b, 20c and 42. The middleware memory may also be one or more of the data storage devices 35.

The fifth vendor processor in the fifth vendor V3 may be programmed to provide a fifth vendor services module 152 and a fifth vendor V5 API 154. Similarly, the sixth vendor processor in the sixth vendor V6 may be programmed to provide a sixth vendor services module 162 and a sixth vendor V6 API 164.

The middleware processor may be programmed to include vendor APIs 154, 164 and the learning management system API 54.

Each of the vendor services module 152 and 162 may perform vendor services. The vendor services may implement at least a part of one or more electronic learning services that provides at least some of the functionalities and tools provided by the system 10 as described herein above.

In the embodiment as shown, all of the services provided by the vendor services module 152 and 162 are both active and passive. This is only for illustrative purposes and in other embodiments the services may only be passive, or active.

The vendors V5, V6 may request services to, and receive service requests from the learning management system 50. Since the vendors V5, V6 are unaware of the learning management system API 54, they may not request services from the learning management system 50 using that API. Similarly, the learning management system 50 is unaware of the vendors APIs 154, 164 so it cannot request services from vendors V5, V6 using those APIs.

The middleware system 170 may facilitate service requests from the vendors V4, V5 to the learning management system 50 and vice versa. The middleware system 170 includes both the vendor APIs 154 164 and learning management API 54.

The middleware system 170 may be programmed to receive native service requests from vendors V5, V6 and convert them to conform them according to LMS API to request services from the learning management system 50. Similarly, the middleware system 170 may be programmed to receive native service requests from the learning management system 50, and covert them according to each of the vendor APIs 154, 164 prior to forwarding the requests to the vendors 150, 160.

Not all requests may be convertible, and/or some factors may be lost during the conversion. It is also possible that a conversion module may be necessary in the learning management system 50, and the vendors V5 and V6 to convert service requests to middleware understandable format. The middleware system 170 may be employed in exemplary situations where the learning management system 50 and vendors 150, 160 are developed in isolation without knowledge of each other's APIs, and no effort had been made to integrate each other's APIs.

Vendor processors and learning management processors may be implemented by any combination of computing devices 20 and the processing devices 32. A single processor may implement the learning management processor and one or more vendor processors. Similarly, vendor memories may be implemented by any combination of computing devices 20 and processing devices 32, a single memory may implement the learning management memory and one or more vendor memories.

In other embodiments, the learning management system 50, and or each of the vendors V1-V6 may further include an extensibility layer to facilitate communication with external systems.

Configurations of vendors V1-V6 described herein are only for exemplary purposes, and modifications, substitutions, changes, and equivalents may occur to those of ordinary skill in the art without abandoning the essence of the invention.

While certain features of the invention has been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An extensible electronic learning system operated by an educational services provider comprising:

at least one learning management system having a learning management processor and a learning management memory operatively coupled thereto, said processor programmed for providing at least one extensible integration module, each extensible integration module comprising:

i. a predefined vendor services interface configured for requesting vendor services from at least one vendor system, the vendor services comprising one or more electronic learning services and the predefined vendor services interface comprising at least one vendor services definition based on a parameter required for the at least one vendor services definition, and ii. a vendor configuration upload component configured for receiving vendor configuration settings about the at least one vendor system, the vendor configuration upload component configured for receiving one or more vendor configuration settings from at least one vendor integration module of the at least one vendor system, wherein each vendor integration module comprises a corresponding predefined vendor services interface, wherein the extensible integration module includes at least one or more configuration settings of the learning management system and one or more of the vendor configuration settings, wherein the at least one vendor system is not the educational services provider;

wherein the one or more electronic learning services comprise an electronic tool for at least one of electronic live or prerecorded lecture webcasts, online presentations, electronic publications, generation of electronic course content, electronic chat rooms, online course management; and wherein the learning management processor of the at least one learning management system is programmed to provide a learning management services module for performing at least one learning management service, the at least one learning management service comprising at least one of the one or more electronic learning services provided by the at least one vendor system upon request.

2. The system of claim 1 wherein the extensible integration module further comprises a predefining management services interface having at least one learning management services definition.

3. The system of claim 2 wherein the vendor integration module further comprises a corresponding at least one predefined learning management service interface.

4. The system of claim 1 wherein the learning management processor is further programmed for actively requesting the at least one of said vendor services via the extensible integration module.

5. The system of claim 3 wherein the at least one extensible integration module is configured to receive one or more requests from the at least one vendor system.

6. The system of claim 1 wherein at least one of said learning management services is integrated with at least one of said vendor services based on the at least one vendor services definition.

7. The system of claim 2 wherein at least one of said vendor services is deeply integrated with at least one of said learning management services based on the at least one learning management services definition.

8. The system of claim 6 wherein the learning management processor is further programmed for not requesting vendor services from the at least one vendor system if the vendor configuration settings for the at least one vendor system are not received in the vendor configuration upload component.

9. The system of claim 1 wherein the at least one vendor configuration settings comprises vendor information for requesting services from the vendor associated with the vendor configuration settings.

10. The system of claim 1 wherein the vendor configuration settings comprises at least one of vendor location information, communication security information, and authentication information.

11. The system of claim 1 wherein the at least one vendor system comprises a plurality of vendors.

12. A computer implemented extensible electronic learning method using a processor and a memory operatively coupled thereto comprising steps of:
providing at least one extensible integration module from an educational services provider, the at least one extensible integration module comprising a predefined vendor services interface for requesting vendor services from at least one vendor system, the vendor services comprising one or more electronic learning services, the predefined vendor services interface having at least one vendor services definition based on a parameter required for the at least one vendor services definition associated with the at least one vendor system that is not the educational services provider, and the at least one extensible integration module further comprising a vendor configuration upload component configured for receiving vendor configuration settings from the at least one vendor system, wherein the vendor configuration upload component receives one or more vendor configuration settings from at least one vendor integration module of the at least one vendor system, wherein each vendor integration module comprises a corresponding predefined vendor services interface, wherein the extensible integration module includes at least one or more configuration settings of one or more of the vendor configuration settings and wherein the one or more electronic learning services comprise an electronic tool for at least one of, electronic live or prerecorded lecture webcasts, online presentations, electronic publications, generation of electronic course content electronic chat rooms online course management; and
providing a learning management services module for performing at least one learning management service, the at least one learning management service comprising at least one of the one or more electronic learning services provided by the at least one vendor system upon request.

13. The method of claim 12 further comprising the step of receiving the vendor configuration settings from the at least one vendor system, the vendor configuration settings containing information used to communicate with the at least one vendor system, said information comprising location of the at least one vendor system, secret keys, passwords, performance settings, display options and encryption settings.

14. A computer implemented extensible electronic learning method using a processor and a memory operatively coupled thereto comprising steps of:
receiving a request for vendor services at at least one vendor system, the vendor services comprising one or more electronic learning services, the request being from a learning management system provided by an educational services provider using a predefined learning management interface having at least one learning management services definition based on a parameter required for the at least one learning management services definition and vendor configuration settings;
providing at least one vendor integration module comprising the predefined learning management services interface and a vendor configuration upload component, wherein the vendor integration module includes at least one or more configuration settings of the learning management system and one or more of the vendor configuration settings, wherein the vendor configuration upload component receives one or more vendor configuration settings from at least one vendor integration module of the at least one vendor system, wherein each vendor integration module comprises a corresponding predefined vendor services interface, and wherein the at least one vendor system is not the educational services provider, and wherein the one or more electronic learning services comprise an electronic tool for at least one of: electronic live or prerecorded lecture webcasts, online presentations, electronic publications, generation of electronic course content, electronic chat rooms, online course management; and
providing a learning management services module for performing at least one learning management service, the at least one learning management service comprising at least one of the one or more electronic learning services provided by the at least one vendor system upon request.

15. The method of claim 14 further comprising uploading the vendor configuration settings to the vendor configuration upload component, wherein the vendor integration module requests the at least one learning management service from the learning management system based at least in part on the vendor configuration settings.

16. A tangible, non-transitory computer readable medium including computer executable instructions which, when executed on a computing device, cause the computing device to:
provide at least one extensible integration module from an educational services provider, the at least one extensible integration module comprising a predefined vendor services interface for requesting vendor services from at least one vendor system, the predefined vendor services interface having at least one vendor services definition based on a parameter required for the at least one vendor services definition associated with the at least one vendor system that is not the educational services provider, and the at least one extensible integration module further comprising a vendor configuration upload component configured for receiving vendor configuration settings from the at least one vendor system, wherein the vendor configuration upload component receives one or more vendor configuration settings from at least one vendor integration module of the at least one vendor system, wherein each vendor integration module comprises a corresponding predefined vendor services interface, wherein the extensible integration module includes at least one or more configuration settings of one or more of the vendor configuration settings, wherein the at least one vendor system is not the educational services provider, and wherein the one or more electronic learning services comprise an electronic tool for at least one of: electronic live or prerecorded lecture webcasts, online presentations, electronic publications, generation of electronic course content, electronic chat rooms, online course management; and provide a learning management services module from the educational services provider for performing at least one learning management service, the at least one learning management service comprising at least one of the one or more electronic learning services provided b the at least one vendor system upon request.

17. The computer readable medium of claim 16, wherein the instructions, when executed on the computing device, cause the computing device to receive the vendor configuration settings from the at least one vendor system, the vendor configuration settings containing information used to communicate with the at least one vendor system, said information comprising location of the at least one vendor system, secret keys, passwords, performance settings, display options and encryption settings.

* * * * *